United States Patent
Stahl

[15] 3,693,713
[45] Sept. 26, 1972

[54] FINNED TUBE AND METHOD OF MANUFACTURE

[72] Inventor: Frederick J. Stahl, Hawthorne, N.J.

[73] Assignee: Curtis-Wright Corporation

[22] Filed: July 16, 1970

[21] Appl. No.: 55,494

[52] U.S. Cl. ................................................165/184
[51] Int. Cl. .................................................F28f 1/14
[58] Field of Search............................165/181, 184

[56] References Cited

UNITED STATES PATENTS 927,702    7/1909    Zent...........................165/184
3,148,441  9/1964    Schuler......................165/181

*Primary Examiner*—Charles Sukalo
*Attorney*—Arthur Frederick and Victor D. Behn

[57] ABSTRACT

A finned tube which has a helical surface element formed by displacement of a portion of the tube wall and securing to the distal end edge of the surface element a helical extension member so that the surfaces of the latter lie substantially in co-planar relation to the surface element, the extension member functioning to increase the heat transfer rate per unit length of tube.

3 Claims, 3 Drawing Figures

PATENTED SEP 26 1972 3,693,713

INVENTOR.
FREDERICK J. STAHL
BY
Arthur Frederick
ATTORNEY

FINNED TUBE AND METHOD OF MANUFACTURE

This invention relates to heat exchangers and, more particularly, to tubes for heat exchangers having extended surface elements and the method fabrication of such tubes.

BACKGROUND OF THE INVENTION

In the fabrication of tubes or pipes having radially extending surface elements or fins where the fins are produced from the walls of the tubes, as for example by extrusion, skiving, or the like, the dimension of the fins is limited by the amount of material which can be obtained from the material in the tube wall. This limitation on the dimensions of the fins imposes a restriction on the application of such tubes in heat exchangers so that they are unsuitable for applications where a relatively high heat transfer rate per unit length of tube is required.

Accordingly, it is an object of this invention to provide an extending surface element tube and the method of its fabrication, which tube has a relatively high heat transfer rate per unit length of such tube.

It is another object of the present invention to provide an extended surface element tube having extended surface elements of relatively large radial dimension in relation to the tube diameter.

It is a further object of this invention to provide, in a heat exchanger tube having spirally extruded fins, peripheral extensions to the fins.

It is a still further object of the present invention to provide a method of fabricating a finned tube by extrusion or the like, having surface elements or fins of large radial dimension in relation to the tube diameter.

SUMMARY OF THE INVENTION

It is therefore contemplated by the present invention to provide a novel extended surface element tube and method of fabrication thereof comprising a tubular body having a plurality of longitudinally spaced, radially extending surface elements to which extension members are secured to the distal end portions of the surface elements to lie in co-planar relationship with the surface elements.

In a first embodiment of this invention, the extension member consists of a solid, unitary strip having a thickness substantially that of the thickness of the extended surface elements.

In a second embodiment of this invention, the extension members comprise an elongated flat portion of a thickness approximately one-half the thickness of the extended surface elements and folded upon itself so that the folded sections lie in substantially surface-to-surface abutment.

In a third alternative embodiment of this invention the extension members comprise an elongated flat portion of a thickness substantially less than the thickness of the extended surface elements and folded upon itself so that the folded sections lie in spaced, substantially parallel relationship to each other and secured at the distal end edges of the folded sections to the extended surface elements to form a fluid tight chamber or passageway in which a liquid, such as liquid sodium or other liquid metal may be placed.

The exposed surfaces of the fins may be covered by a cladding of corrosive resistant material either before or after securing the extension members to the extended surface elements. It is considered preferable to clad the exposed surfaces of the extension members before folding and securing them to the extended surface elements.

The method of fabricating the extended surface element tubes according to this invention is to displace a portion of the tube wall, as by extrusion, to form radially extending surface elements helically encircling the tube and, thereafter, welding as for example by resistance welding, a helically formed strip, having a lead corresponding to that of the helical surface elements, to the distal end of the surface elements.

The method of fabricating the extended surface element tubes according to the second and third embodiments of this invention includes, in addition to the aforesaid fabrication steps, the step of folding an elongated strip and thereafter helically forming the folded strip before welding the strip to the distal end edge of the surface elements. If crimping of the elongated strip when wrapped about the tubular body is objectionable for a particular heat exchange application, the strip may be provided with a plurality of spaced slits extending from one elongated edge of the strip to a point short of the opposite elongated edge.

BRIEF DESCRIPTION OF THE DRAWINGS

The invention will be more fully understood from the following detailed description thereof when considered in connection with the accompanying drawing wherein several embodiments of the invention are illustrated by way of example and in which.

DESCRIPTION OF PREFERRED EMBODIMENTS

Figure 1:
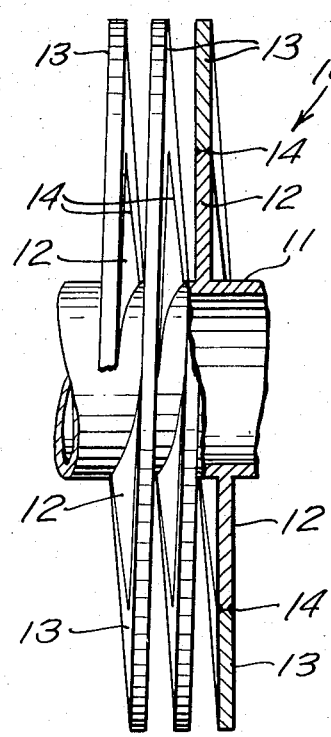
FIG. 1 is a fragmentary view, partly in section of a tube having extended surface elements according to a first embodiment of this invention.

Now referring to the drawing and specifically FIG. 1, the reference number 10 generally designates the heat exchanger tube having radially extending surface elements or fins (hereinafter referred to as a finned tube) according to a first embodiment of this invention. As shown, finned tube 10 comprises a tubular body portion 11 from which radially extending fins 12 are formed by displacement of material from the walls of body portion 11. The tubular body 11, while shown circular in cross section, may have a square or oval configuration in cross section without departing from the scope and spirit of this invention. This displacement or deformation of a portion of the tube body portion 11 may be achieved by extrusion or any other suitable process. The fins 12, as illustrated, may be so formed as to comprise a continuous, extending surface element helically encircling the body portion 11. Since fins 12 are formed from the body portion 11, the radial dimension of fins 12 is limited. To increase the surface area of fins 12 and thereby increase the heat transfer rate per unit of tube length, fins 12 are provided with extension members 13. The extension members 13 are substantially the same thickness of fins 12 and are secured to the distal end edge of fins 12 by welding, at 14, as for example resistance welding, so that the extension members 13 lie in substantially co-planar relationship with the surfaces of fins 12. The length of extension members 13 in a radial direction can be of any suitable dimension to achieve the desired heat transfer rate per unit length of the tube. If fins 12 are helically formed, extension members 13 may be a continuous, flat strip, helically formed with a lead corresponding to the lead of the helix of fins 12 so that the inner end edges of extension members 13 abut the distal peripheral end edges of fins 12. The welding together of the abutting edges of fins 12 and extension members 13, at 14, may be achieved by a continuous resistance welding technique by translatory movement of the welding electrodes while rotating the tube or rotating the welding electrodes as the latter move rectilinearly with the tube remaining stationary.

Figure 2:
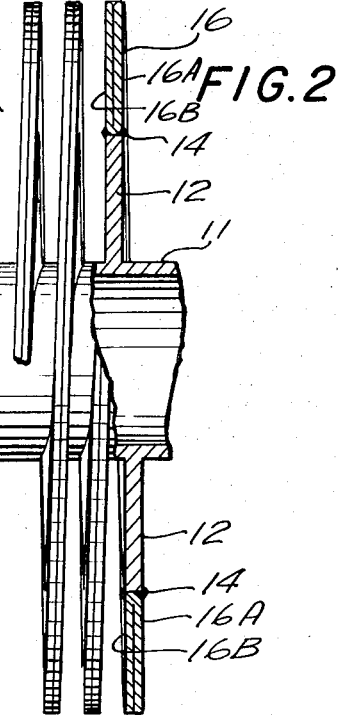
FIGS. 2 and 3 are fragmentary views, similar to FIG. 1 showing tubes having extended surface elements according to second and third embodiments of this invention, respectively.

In FIG. 2 is shown a finned tube 15 according to a second embodiment of the present invention which essentially differs from finned tube 10 shown in FIG. 1 in that the extension members are fabricated from a strip folded upon itself rather than being made of a single thickness of material. In view of the similarity of finned tubes 10 and 15, parts of finned tube 15 corresponding to like parts of finned tube 10 will be identified by the same number.

As illustrated, extension member 16 comprises a strip of material folded in the middle and back upon itself so that the two fold sections 16A and 16B lie substantially in surface-to-surface abutment. To provide that the outer surfaces of fold sections 16A and 16B lie in substantially co-planar relationship with the surfaces of fins 12, the fold sections of the strip have thicknesses approximately half the thickness of fins 12. As in the previous embodiment shown in FIG. 1, the folded strip, consisting of fold sections 16A and 16B, is welded, at 14, by suitably welding technique well known to those skilled in the welding art, such as by a continuous resistance welding technique. The folded strip may be coated or cladded on one side with a layer of corrosive resistant material and, then, folded so that the outer surfaces of fold sections 16A and 16B are the cladded surfaces. If more exposed fin surface is desired, the folded strip may be provided with a plurality of spaced slits or cuts (not shown) before or after being secured to fins 12 and then the fold sections 16A and 16B spread apart or "combed." Although the fold sections 16A and 16B are shown secured, at 14, to fins 12 at the fold portion, it is within the purview of the invention to secure the fold sections to the fins 12 with the fold portion forming the outer peripheral end edge of extension member 16.

The welding together of the abutting edges of fins 12 and extension members 13 and 14 could be achieved by a continuous resistance welding technique in conjunction with a series of rollers, guides, shoes, and tension bars as is well known by those skilled in the art. Such mechanisms would be arranged in a manner so as to allow for complete processing of spool mounted rolled sheet stock. The sheet stock would then be automatically fed through horizontal rollers and then between vertical rollers contoured to create a centrally located crease along the sheet stock axis. The sheet would then pass through a series of adjacent vertical rollers in parallel with vertically positioned guides and shoes adjusted to coincide with pitch of fins 12. A final vertical roller formed to track the outside diameter of extension members would be positioned in such a manner as to provide radial pressure on extension member 13 during the welding operation.

Figure 3:
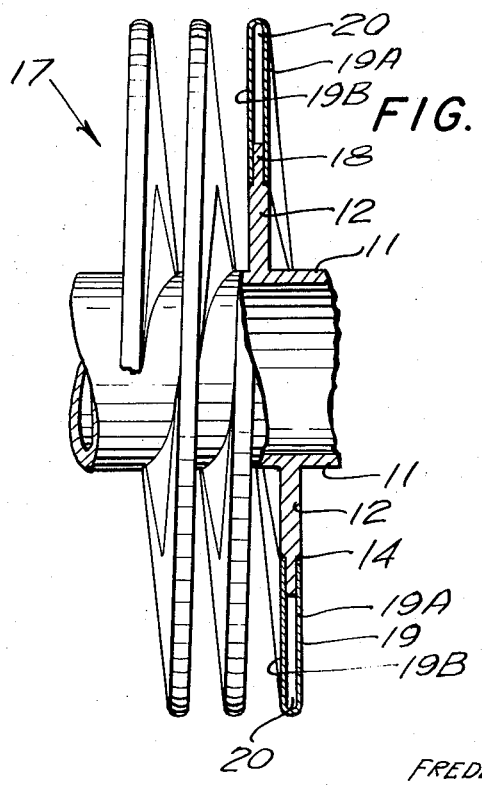

In FIG. 3 is illustrated a finned tube 17 according to a third embodiment of this invention which essentially differs from the finned tubes 10 and 15 shown in FIGS. 1 and 2, respectively, in that the extension members define with fins 12 fluid tight chambers which may be filled with a liquid metal, such as sodium. Because of the commonable features, parts of finned tube 17 corresponding to like parts of finned tubes 10 and 15 will be identified by the same number.

As shown in FIG. 3, the outer, distal peripheral edge portion 18 of fins 12 is of reduced thickness to form juxtaposed shoulders against which extension members 19 abut and are secured. The extension members 19 of finned tube 17 are formed from a flat strip of material of substantially less thickness than fins 12, which strip is folded back upon itself so that the fold sections 19A and 19B lie in spaced, substantially parallel relationship with each other. The distal end portions of fold sections 19A and 19B are positioned in abutment against the shoulders formed by the reduced thickness portion of fins 12 and are welded, as by resistance welding, at 14, to fins 12. The fold sections 19A and 19B define with fins 12 a fluid tight chamber 20 in which a liquid metal, such a sodium, mercury, or the like, can be placed. In a heat exchange application where a fluid tight chamber 20 is not required, the flat strip, after folding, would be provided with a plurality of parallel slits or cuts (not shown) spaced along the fold portion and extending to a point short of the end edges of the fold sections 19A and 19B.

It is believed that it is now apparent that the present invention provides a novel finned tube and method of fabricating the same which finned tube has a high heat transfer rate per unit of tube length.

Although several embodiments of the invention have been illustrated and described in detail, it is to be expressly understood that the invention is not limited thereto. Various changes can be made in the arrangement of parts or steps without departure from the spirit and scope of the invention as the same will now be understood by those skilled in the art.

What is claimed is:

1. A finned heat exchanger conduit comprising:
   a. a hollow body portion;
   b. a plurality of longitudinally spaced, radially extending external surface elements connected to the body portion;
   c. a plurality of extension members secured to the distal end portions of said surface elements so that the extension members lie in co-extensive relationship with the surface elements; and
   d. said extension members comprise two integral sections disposed in spaced substantially parallel relationship to each other and secured to the surface elements in a fluid tight manner to define with the latter chamber means.

2. The apparatus of claim 1 in which chamber means contains liquid metal.

3. The apparatus of claim 1 wherein said body portion is tubular and wherein said radially extending, external surface elements are formed integrally with the tubular body portion and arranged to helically encircle the tubular body and said extension members consist of a folded-flat strip having a helical configuration complementary to the helix of the extending external surface elements and secured along the free edge portions to the distal portions of the surface elements.

* * * * *